(12) United States Patent
Shaw

(10) Patent No.: US 6,765,837 B1
(45) Date of Patent: Jul. 20, 2004

(54) HIGH-DENSITY MEMORY DEVICE FORMED WITH MICROHOLES AND THE RECORDING METHOD THEREOF

(76) Inventor: Sen-Yen Shaw, 3 Fl., No. 73, Hsin-Kuang Road, Hsin-Chu (TW)

( * ) Notice: Subject to any disclaimer, the term of this patent is extended or adjusted under 35 U.S.C. 154(b) by 0 days.

(21) Appl. No.: 10/384,211

(22) Filed: Mar. 5, 2003

(51) Int. Cl.[7] .................................................. G11C 7/00

(52) U.S. Cl. ...................... 365/215; 365/106; 365/171; 365/230.01

(58) Field of Search ................................ 365/215, 106, 365/171, 230.01

(56) References Cited

U.S. PATENT DOCUMENTS 5,568,421 A * 10/1996 Aritome ................ 365/185.17

* cited by examiner

Primary Examiner—Michael S. Lebentritt
Assistant Examiner—Pho M. Luu

(57) ABSTRACT

A memory device includes a substrate, at least a thin film superimposed on the substrate having a plurality of microholes formed in the thin film, with a first microhole having a zero depth designated as digital zero; and a second microhole having a specific depth (such as the microhole formed through the thickness of the thin film) designated as digital one; whereby upon scanning of the microholes by a focused electron beam, the physical property as responded in each microhole will be detected as a digital bit corresponding to the microhole, and the microhole, and the digital data of the memory device will be read or recorded in an easier and cost-saving way.

8 Claims, 4 Drawing Sheets

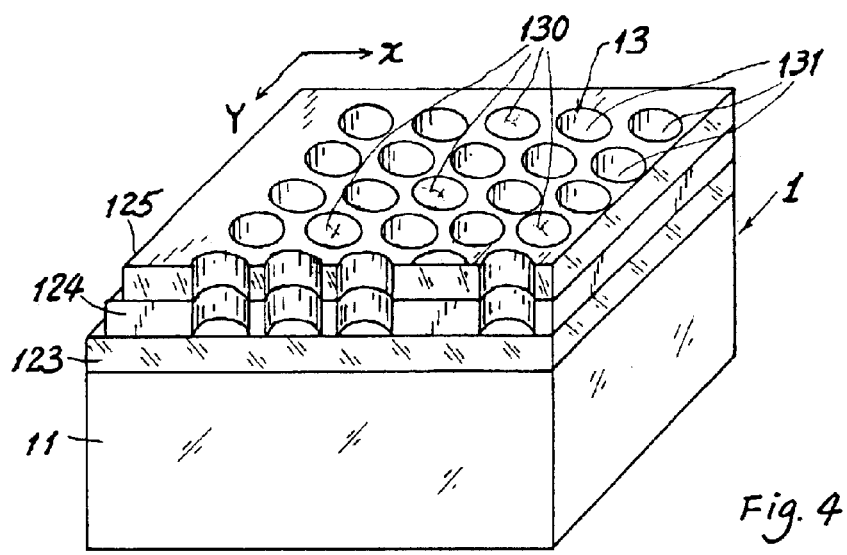
Fig. 4
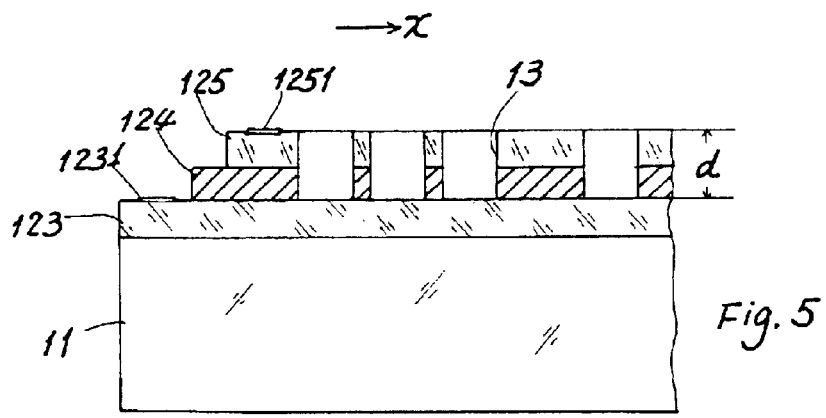
Fig. 5
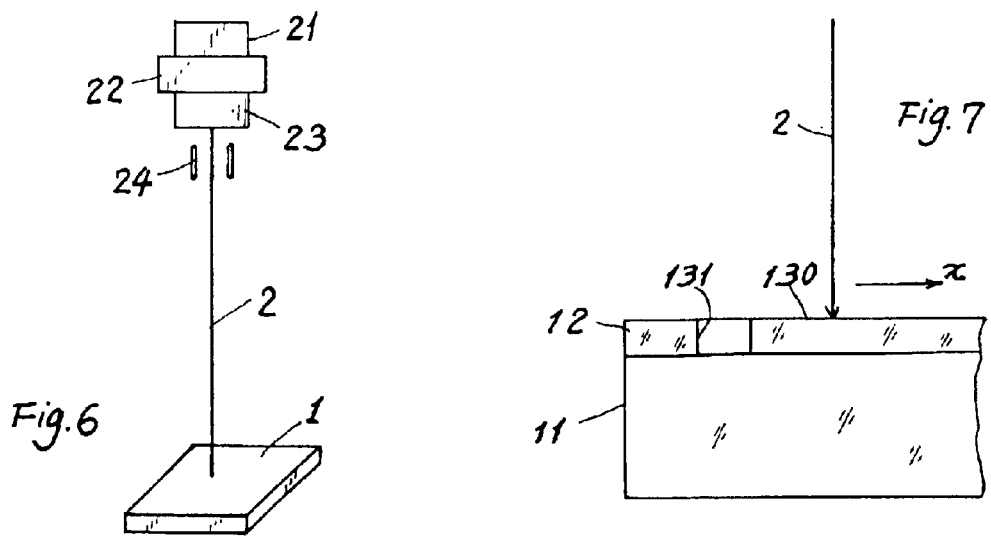
Fig. 6
Fig. 7

HIGH-DENSITY MEMORY DEVICE FORMED WITH MICROHOLES AND THE RECORDING METHOD THEREOF

BACKGROUND OF THE INVENTION

In the modern age of rapidly developing information and related industries, it is expected to produce memory devices with high-density, high speed and high storage capacity of information.

It is known that a microlens-based optical memory media may be provided for enabling large data volumes to be transferred at a high data rate and thereby permitting the mass production of the optical memory media.

For instance, U.S. Pat. No. 6,005,817 issued to Gudesen et al. disclosed a method for parallel writing and reading of data in an optical memory including a plurality of microlens for accessing a memory medium, individually addressable elements arranged in a matrix or matrices in a write and read device to be activated for influencing localized areas in the memory for writing and reading of data carrying structures in the localized areas. However, to precisely and reliably fix the plurality of microlens on the memory module requires a very sophisticated manufacturing technique, thereby greatly increasing the production cost thereof. Meanwhile, the storage density of this prior art will be limited by the wavelength of the light source as selected, thereby influencing its commercial value.

The present inventor has found the drawbacks of the conventional memory device and invented the present memory device with microholes.

SUMMARY OF THE INVENTION

The object of the present invention is to provide a memory device including a substrate, at least a thin film superimposed on the substrate having a plurality of microholes formed in the thin film, with a first microhole having a zero depth designated as digital zero; and a second microhole having a specific depth (such as the microhole formed through the thickness of the thin film) designated as digital one; whereby upon scanning of the microholes by a focused electron beam, the physical property as responded in each microhole will be detected as a digital bit corresponding to the microhole, and the digital data of the memory device will be read or recorded in an easier and cost-saving way.

BRIEF DESCRIPTION OF THE DRAWINGS

FIG. 4 is a perspective enlarged view of another preferred embodiment of the memory element of the present invention.

FIG. 5 is a partial sectional drawing of the present invention as shown in FIG. 4.

FIG. 6 is an illustration showing the fabrication process of the memory element of the present invention by lithography method with focused ion beam.

FIG. 7 is a sectional drawing illustrating the process as shown in FIG. 6.

DETAILED DESCRIPTION

Figure 1:
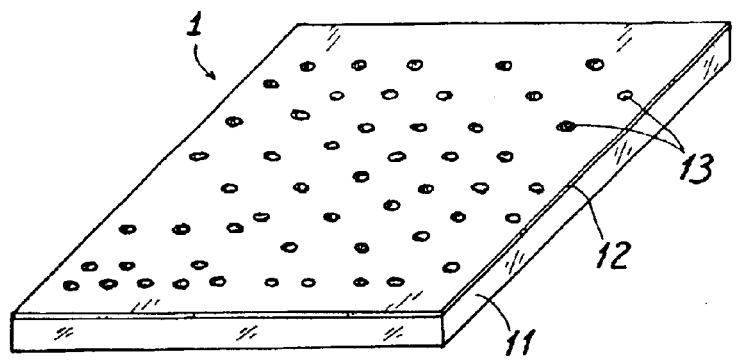
FIG. 1 is a perspective view of a memory element formed with microholes in accordance with the present invention.
Figure 2:
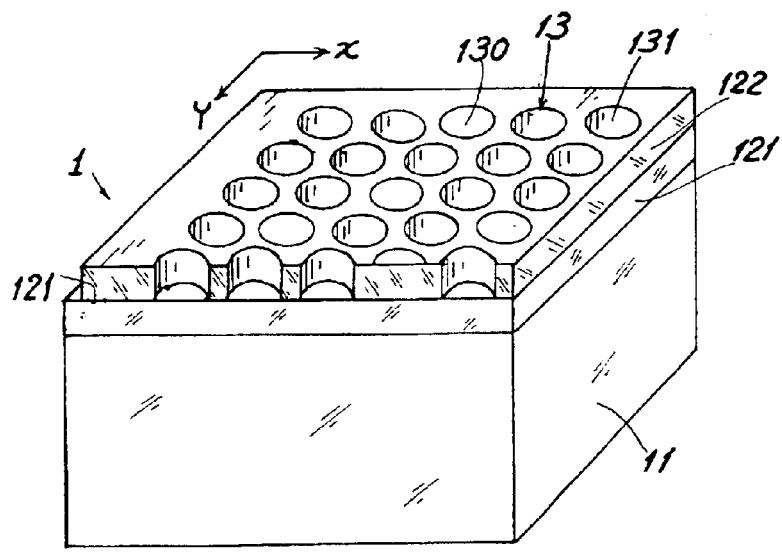
FIG. 2 is a perspective enlarged view of the memory element of the present invention.

As shown in FIG. 1, the memory element 1 of the present invention comprises: a substrate 11, a thin-film layer set 12 superimposed on the substrate 11, and a plurality of microholes 13 formed in the thin-film layer set 12 for recording digital data to which the microholes 13 correspond. Each microhole 13 is designated as a memory unit or a digital bit for the memory device of the present invention. The plurality of microholes 13 may be arranged in one dimensional or two-dimensional memory address or matrix in or on the thin-film layer set 12, such as the coordinate memory address (X, Y) including the abscissa location X and the ordinate location Y as shown in FIG. 2. Each microhole 13 is assigned with a memory address on the memory element 1.

Figure 3:
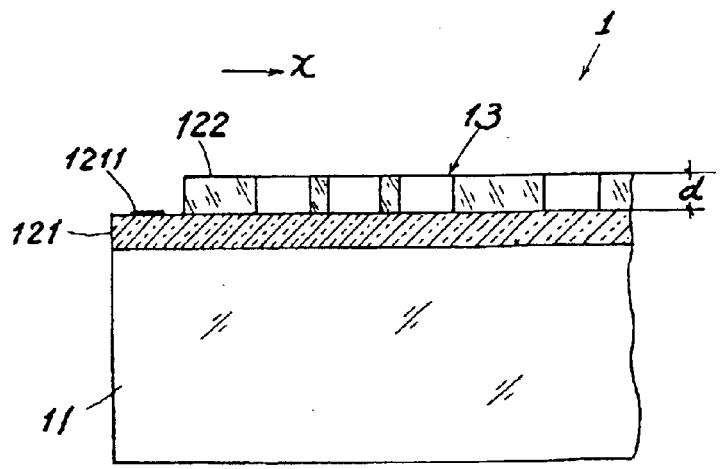
FIG. 3 is a partial sectional drawing of the present invention as shown in FIG. 2.

As shown in FIGS. 2, 3, the substrate 11 of the present invention is made of transparent (or light-transmissive) materials. The thin-film layer set 12 includes: a transparent (or light-transmissive) electrically-conductive film 121 superimposed on the substrate 11, and a fluorescent film 122 made of fluorescence material and superimposed on the transparent electrically-conductive film 121. The transparent electrically-conductive film 121 is formed with at least an electrode 1211 thereon for externally transferring current signal from the film 121 when activated. The fluorescence material of the film 122 is also electron beam-sensitive material.

The fluorescent film 122 has a thickness of "d". The microholes 13 includes at least a first microhole 130 having zero (0) depth in the fluorescent film 122, namely, having no recess as recessed in the fluorescent film 122 to be designated as the digital bit of "0"; and at least a second microhole 131 having a depth equal to the thickness (d) of the fluorescent film 122, namely, with the second microhole 131 formed or tunneled through the thickness (d) of the fluorescent film 122 to designate the digital bit of "1". The location of each microhole 13 on the memory element 1 is referred as a coordinate memory address (X, Y) of the microhole.

As shown in FIGS. 4, 5, the thin-film layer set 12 is modified to include: a first electrically-conductive film 123 superimposed on the substrate 11, a second electrically-conductive film 125 positioned above the first electrically-conductive film 123 as partitioned by an electrically-insulative film 124 sandwiched between the first and second electrically-conductive films 123, 125.

The first electrically-conductive film 123 is coated thereon or formed therein with a first electron beam-sensitive material to generate a first current signal upon irradiation by the electron beam; while the second electrically-conductive film 125 is coated or formed with a second electron beam-sensitive material to generate a second current signal upon irradiation of the electron beam to be different from that of the first film 123.

Each electrically-conductive film 123, 125 is respectively formed with electrodes 1231, 1251 thereon for externally conducting the current signals as sensed from the electrodes on either film 123, 125 to an electronic control or detecting circuit (not shown) for processing or recording the signals. Each second microhole 131 is formed through the second electrically-conductive film 125 and the electrically-insulative film 124. The total thickness of the second electrically-conductive film 125 and the electrically-insulative film 124 is equal to a depth "d" of each second microhole 131 formed therethrough. The zero depth of each first microhole 130 is designated as digital zero (0); while the maximum depth (d) of each second microhole 131 is designated as digital one (1). The coordinate location (X, Y) of each microhole 13 on the memory element 1 indicates its memory address of the memory element 1.

A microimage lithography or focused ion (or electron) beam etching method may be used for recording the memory address of each microhole 13 on (in) the memory element 1 of the present invention.

As shown in FIGS. 6, 7, a recording apparatus is provided for etching the microholes 13 of the present invention, which includes: an ion generator 21, an ion accelerator 22, an ion beam-focusing lens 23 and a scanning electrode for X and Y axes 24.

The memory element 1 of the present invention is placed on a focusing position adapted to be focused by the ion beam 2 as irradiated from the ion generator 21 and manipulated by the ion accelerator 22, the lens 23 and the scanning electrode 24 of the recording apparatus as shown in FIG. 6.

The focused ion beam 2 is deflected to a target position corresponding to the memory address of each microhole 13 as preset in the memory element 1 of the present invention, and the applying current and etching time of the recording apparatus should also be controlled correspondingly, each microhole 13 will be formed in the thin-film layer set 12 to a zero depth or a depth of d (as formed through the thickness of the film of the thin-film layer set 12). By the way, all the microholes 13 are formed in the memory element 1 accordingly.

The present invention may be read or retrieved by focused electron beam as respectively shown in FIGS. 8~12, which will be subsequently described hereinafter.

Figure 8:
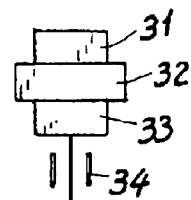
FIG. 8 is an illustration showing the reading method and equipments for the memory element as shown in FIG. 3.
Figure 9:
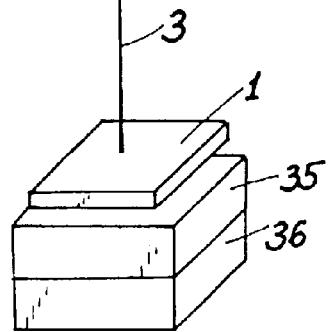
FIG. 9 is a sectional drawing illustrating the method as shown in FIG. 8.
Figure 9:
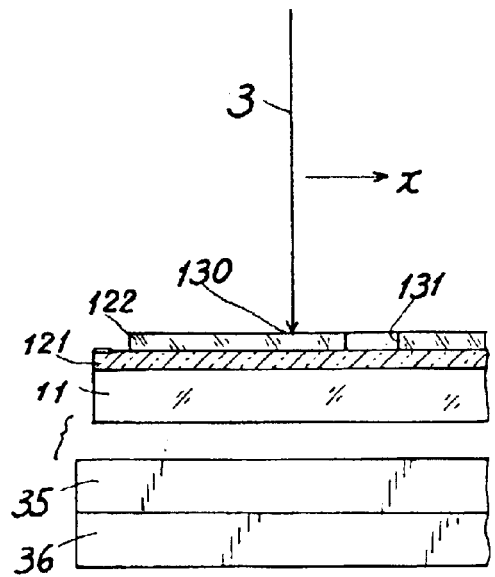

As shown in FIGS. 8, 9, a reading apparatus of the present invention comprises: an electron-beam emitting means 30 including an electron gun 31, an electron accelerator 32, an electron beam-focusing lens 33 and a scanning electrode for X and Y axes 34 for irradiating electron beam 3 towards the target memory element 1; and a detector (which may be a photo detector) 36 positioned under the memory element 1 for sensing the signal as collected from a signal collector (which may be a photo collecting lens) 35 as positioned between the memory element 1 and the detector 36.

When reading the present invention as shown in FIGS. 8, 9, the memory element 1 (as shown in FIGS. 2, 3) is fixed on a focusing plane, and the focused electron beam 3 is deflected and scanned on the memory element 1, for instance, along with the X-direction. The electron beam 3 when irradiating through the second microhole 131 (having depth "d") formed through the fluorescent film 122, namely, the electron beam 3 does not impinge on the fluorescent film 122 so that the fluorescence $F_1$ thus excited is very low, which after being collected by lens 35 through the transparent film 121 and substrate 11 will then be sensed by the detector 36 as shown in FIG. 9, thereby receiving a low (fluorescence) signal ($F_1$) to indicate the reading of digital one ("1") from the said second microhole 131 which corresponds to a specific memory address on the memory element 1. When the electron beam 3 irradiates on the first microhole 130 (having zero depth) in the fluorescent film 122, the fluorescence F2 thus excited will be projected through the transparent film 121 and substrate 11 to be sensed by the detector 36 as collected by the lens 35. The detector 36 will sense a fluorescence activity ($F_2$) through the first microhole 130 (having zero depth) as shown in FIG. 9, which is stronger than the low fluorescence $F_1$ as sensed through the second microhole 131 having a depth "d", indicating the reading of digital zero ("0") of the first microhole 130 corresponding to its specific memory address on the memory element 1.

Accordingly, the digital data corresponding to the related microholes 130, 131 will be easily read from the memory element 1 of the present invention.

Since the fluorescence from the fluorescent film 122 as excited by the electron beam 3 may also be converted to a current signal which may be externally transferred through the electrodes 1211 formed on the transparent electrically-conductive film 121, the digital bits 0 or 1 may also be read through an electronic circuit or digital circuit (not shown) through the electrodes 1211, thereby forming another preferred embodiment of the reading method of the present invention. That is to say, the optical sensing method by the photo detector 36 as above-mentioned may be modified to be an electronic or electric sensing method by comparing the current signals of the stronger fluorescence $F_2$ as effected through the first microhole 130 having zero depth with the weaker fluorescence $F_1$ as effected through the second microhole 131 having depth of "d". The stronger fluorescence $F_2$ indicates a digital zero (0); while the weaker fluorescence $F_1$ indicates a digital one (1), thereby easily obtaining the digital data from the memory address of the present invention.

Figure 10:
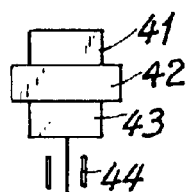
FIG. 10 shows another reading method and equipments for the memory element as shown in FIG. 5.
Figure 11:
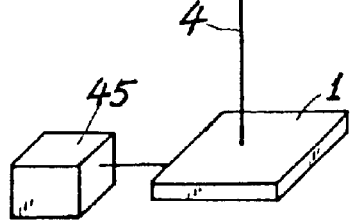
FIG. 11 is a sectional drawing illustrating the method as shown in FIG. 10.
Figure 11:
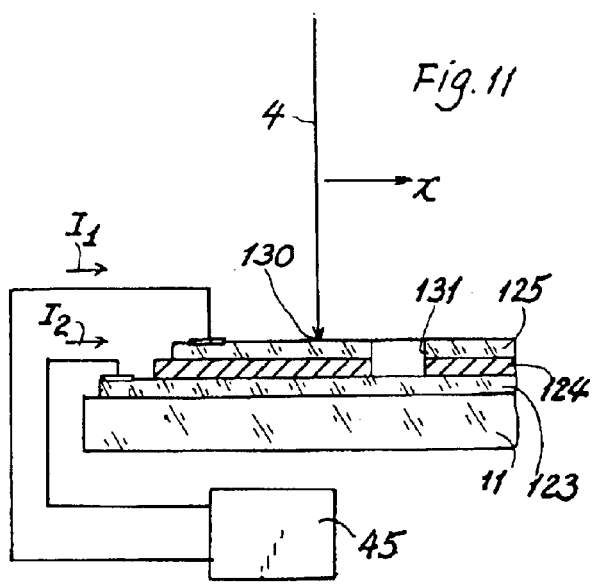

As shown in FIGS. 10, 11, another reading apparatus for reading the memory data in the element 1 as shown in FIGS. 4, 5 of the present invention comprises: an electron gun 41, an electron accelerator 42, an electron beam focusing lens 43, a scanning electrode for X and Y axes 44 and a detector 45.

The memory element 1 of the present invention is fixed on a focusing plane of the focused electron beam 4 which is irradiated by the electron gun 41 through the accelerator 42, the focusing lens 43 and scanning electrode 44. When reading the present invention by deflecting and scanning the electron beam 4 along the X direction such as shown in FIG. 11, the current signals $I_1$, $I_2$ respectively from the electrode 1251 of the second film 125 and the electrode 1231 of the first film 123 will be sensed and compared in the detector 45 which includes a current amplifying circuit and a comparator circuit for comparing the difference of the two current $I_1$, $I_2$ respectively sensed from the second and first films 125, 123. Since the two films 123, 125 are respectively coated or formed with different electron beam-sensitive materials for producing different current ($I_1$, $I_2$) upon irradiation by the electron beam 4, the detector 45 once sensing the current signals with different current values will distinguish the different digital bits such as digital zero (0) or digital one (1) depending upon the preset digital bit (0 or 1) for each specific current ($I_1$ or $I_2$) for the first microhole 130 of the zero depth or the second microhole 131 of depth of "d". Therefore, the digital memory data of the present invention can be easily read with the following relationship:

| current signal | microhole (hole depth) | digital bit |
| --- | --- | --- |
| $I_1$ | ... numeral 130 (zero depth) ... | ... "0" |
| $I_2$ | ... numeral 131 (depth of d) ... | ... "1" |

The electrically-conductive film is inherently sensitive to electron beam. Different electrically-conductive films may produce different electronic conductivities when irradiated by electron beam. So, two different current signals may be easily sensed respectively from the two electrically-conductive films.

Figure 12:
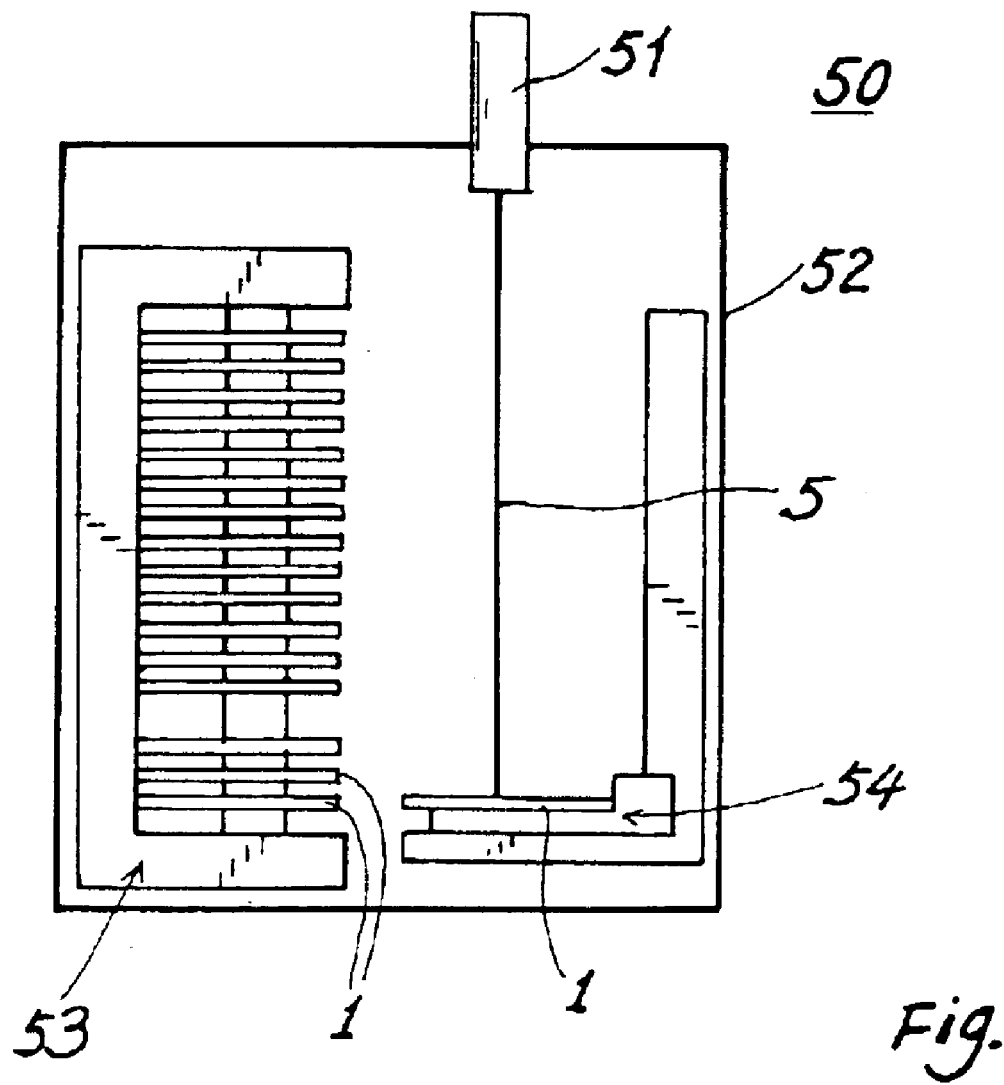
FIG. 12 is an illustration showing still another preferred embodiment of the reading method and the equipments provided for reading a plurality of memory elements of the present invention.

As shown in FIG. 12, a plurality of memory elements 1 of the present invention may be selectively read by the so-called "cassette-type" recording system 50, which includes: a focused electron beam reading means 51, a vacuum container 52, a cassette rack 53 mounted in the container 52 for juxtapositionally storing a plurality of memory elements 1 of the present invention on the rack 53, a pick-up device 54 for selectively retrieving one memory element 1 from the plurality of memory elements 1 as pre-stored in the cassette rack 53 to be irradiated by an electron beam 5 as emitted from the reading means 51 and to be read by the reading means 51 secured in the container 52; and the pick-up device 54 operatively re-locating the memory element 1 into the rack 53 when finishing the reading job.

Therefore, the memory storage capacity of digital data can be greatly greatly increased by multiplying the number of memory elements 1 as stored in the rack 53 in the vacuum container 52.

Whenever performing the reading procedures of the present invention, plural operation or control modes or instructions should be preset, for example, the starting location of the electron beam, the space between any two scanning rows either being set horizontally or vertically, and the scanning memory block areas, in accordance with the distribution (lattice) arrangement of the microholes 13 to be read in the memory element 1.

The specific location for those microholes such as formed in a marginal area of the memory element 1 may be specially designed for the reading convenience by the electron beam or for setting the scanning parameters.

The present invention is superior to the conventional memory devices with the following advantages:

1. The microhole 13 is easily quickly cheaply formed just by thoroughly etching, drilling, evacuating the hole through the thickness of the film or films. So, it is unnecessary to critically strictly control the etching (or drilling) depth as recessed downwardly from a top surface of the thin film layer. It is very simple to obtain a digital zero ("0") with a corresponding geometrical zero depth on the film surface; while a digital one ("1") can also be simply obtained just by forming the hole through the full thickness of the film.

2. The production cost of the present invention is greatly reduced. The substrate 11 can be a glass or metal sheet to greatly reduce the manufacturing cost, being much less than the cost for making the conventional semiconductor elements. The plating or coating on the thin film is very simple such as by conventional photo plating process. The process for recording the microholes is also very simple such as by ultraviolet or X-ray micro-image recording processes with low cost.

3. The digital data of the microholes can be read in a rapid speed, thereby eliminating complex circuit of bus bar or complex optical disk device as used in a conventional system. Furthermore, a plurality of memory elements can be stored in a "cassette" device for optional selection for greatly increasing the memory storage capacity.

4. Each microhole 13 can be minimized to be even less than 10 nm in diameter by using the focused ion or electron beams, thereby satisfying the requirements of high-density and high-storage capacity of the memory informations to be suitable for the modern "nano era".

The present invention may be modified without departing from the spirit and scope of this invention. Some conventional recording devices including writing and reading devices may also be utilized in the present invention.

I claim:

1. A memory device formed by at least a memory element, said memory element comprising:

a substrate; and a thin-film layer set superimposed on said substrate, having a plurality of microholes formed in said thin-film layer set, with each said microhole assigned with a memory address on the memory element; having at least a first microhole having zero depth formed on the thin-film layer set and designated as a digital zero (0) of a memory address corresponding to said first microhole having zero depth; and having at least a second microhole formed through the thickness of at least one film of said thin-film layer set, the thickness of said film being equal to a depth of said second microhole as formed in said thin-film layer set, said second microhole designated as a digital one (1) of another memory address corresponding to said second microhole having said depth of said second microhole formed in said thin-film layer set; whereby upon scanning to said microholes in said memory element, the digital data respectively corresponding to said microholes will be recorded.

2. A memory device according to claim 1, wherein said substrate is formed with transparent or photo-transmissive materials; and said thin-film layer set including a transparent electrically-conductive film superimposed on said substrate, and a fluorescent film made of fluorescence material superimposed on the transparent electrically-conductive film; each said second microhole formed through said fluorescent film and formed through the thickness of said fluorescent film; and each said first microhole formed on said fluorescent film with zero depth; whereby upon irradiation of focused electron beam on said microholes, said first microhole on said fluorescent film will emit a fluorescence to indicate the digital zero; and said second microhole as formed through said fluorescent film will respond no or low fluorescence to indicate the digital one.

3. A memory device according to claim 1, wherein said transparent electrically-conductive film is formed with at least an electrode thereon for externally transferring signals as sensed from said transparent electrically-conductive film.

4. A method for recording a memory device as set forth in claim 1 comprising the utilization of a beam selected from a focused electron beam and a focused ion beam for irradiation and scanning of said beam to the microholes formed (or to be formed) in said memory element for detecting, reading or writing digital data corresponding to said microholes arranged or preset in one and two-dimensional rows in said memory element.

5. A memory device according to claim 1, wherein said thin-film layer set includes: a first electrically-conductive film superimposed on the substrate, a second electrically-conductive film positioned above the first electrically-conductive film as partitioned by an electrically-insulative film sandwiched between the first and second electrically-conductive films; and said first electrically-conductive film coated thereon or formed therein with a first electron beam-sensitive material to generate a first current signal upon irradiation by the electron beam; and the second electrically-conductive film coated or formed with a second electron beam-sensitive material to generate a second current signal upon irradiation of the electron beam to be different from the first current signal of the first electrically-conductive film.

6. A memory device according to claim 5, wherein each said electrically-conductive film is respectively formed with electrodes thereon for externally conducting the current signals as sensed from the electrodes on either said film to an electronic control or detecting circuit for processing or recording the current signals; and having at least a first microhole having a zero depth of the first microhole formed on said second electrically-conductive film and designated as digital zero; and having at least a second microhole formed through the second electrically-conductive film and the electrically-insulative film, with the total thickness of the second electrically-conductive film and the electrically-insulative film being equal to a depth of each said second microhole, and the second microhole designated as digital one.

7. A memory device according to claim 1, wherein said thin-film layer set includes: a first electrically-conductive film superimposed on the substrate, a second electrically-conductive film positioned above the first electrically-conductive film as partitioned by an electrically-insulative film sandwiched between the first and second electrically-conductive films; said first and second electrically-conductive films respectively formed with electrodes thereon; said first and said second electrically-conductive films respectively operatively inducing different current signals upon irradiation by focused electron beam at the microholes formed in said films with different depths.

8. A memory device for recording a plurality of memory elements as set forth in claim 1 comprising: a focused electron beam reading means, a vacuum container, a cassette rack mounted in the container for juxtapositionally storing said plurality of memory elements on the rack, a pick-up device for selectively retrieving one memory element from the plurality of said memory elements as pre-stored in the cassette rack to be irradiated by a focused electron beam as emitted from the reading means secured in the container; and the pick-up device operatively relocating the memory element into the rack when finishing a reading job.

* * * * *